Dec. 19, 1961 H. J. KOZICKI 3,013,813
SPRING UNIT FOR HYDROPNEUMATIC SUSPENSION
Filed May 29, 1958
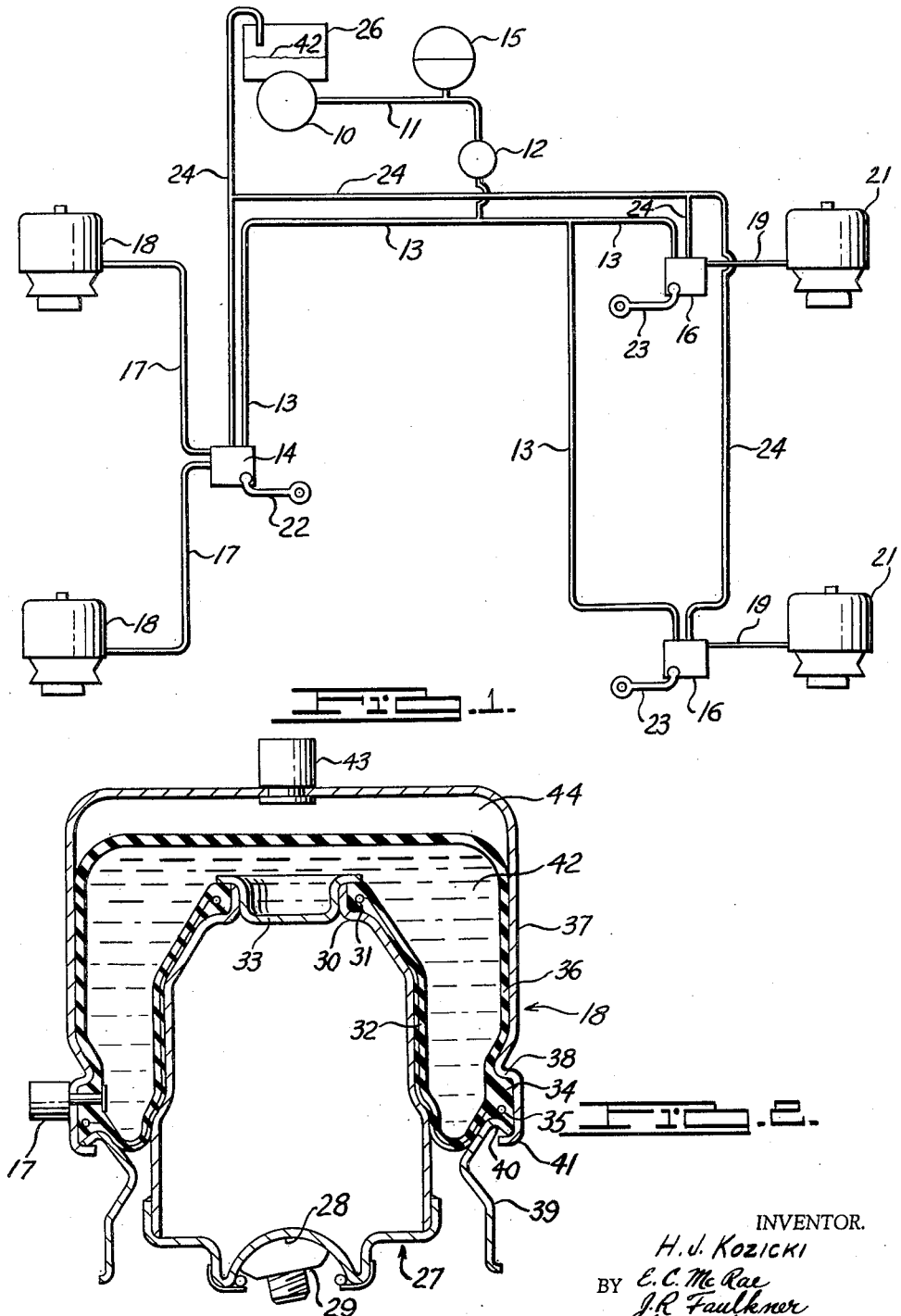
INVENTOR.
H. J. Kozicki
BY E. C. McRae
J. R. Faulkner
J. H. Oster
ATTORNEYS

United States Patent Office 3,013,813
Patented Dec. 19, 1961

3,013,813
SPRING UNIT FOR HYDROPNEUMATIC SUSPENSION
Henry J. Kozicki, Livonia, Mich., assignor to Ford Motor Company, Dearborn, Mich., a corporation of Delaware
Filed May 29, 1958, Ser. No. 738,819
11 Claims. (Cl. 280—124)

This invention relates to a suspension system and more particularly to a new and improved liquid leveled air spring.

Applicant's device is housed within a structural device similar in many respects to a conventional air spring. It is to be understood that although the term air is used, it is possible and contemplated that any one of the variety of compressible gaseous elements, or combinations, may be employed without departing from this invention, of which nitrogen appears at present to be most desirable. In this device, however, several vital differences are to be noted. The air or nitrogen, is trapped in the upper chamber of the liquid leveled air spring in a permanent manner. The remaining portion of the spring is filled with a liquid, oil preferably, which is enclosed within a flexible container. A lower pedestal mounted upon the lower suspension arm travels into jounce and rebound in the usual way. The area and volume changes attained by the movement of the lower pedestal is transmitted directly to the air and causes a rate and rate build-up as if the air were actually enclosed by the flexible container. Because the liquid is used for leveling, a leveling valve ressponsive to motor vehicle height variations, a liquid accumulator and pump means are required to make the system operative. The latter is easily obtainable from the power steering unit or similarly operated devices.

This device has many advantages over the usual air spring and/or hydro-pneumatic constructions. Because a liquid is used for leveling instead of air, condensation and dirt problems are eliminated and seal problems vastly minimized. Air loss, as a result of air permeability to atmosphere, is brought down to commercial minimum by the use of a considerable quantity of liquid acting as a block between the pressurized air in the upper chamber and atmosphere.

Another advantage of this system is that this spring does not require the wheel of the vehicle to move a piston against high liquid oil pressures with attendant problems of friction and friction breakaway as is done in some hydro-pneumatic systems. In the applicant's construction, the spring is frictionless. Since the quantity of liquid is constant between levelings, the spring merely rolls the upper and lower lobes of the flexible container against the contours of the outer shell. In this respect, it is possible and contemplated that the upper chamber portion may be contoured to attain a variety of desired spring rates.

Still another advantage of this system over the conventional air spring is that higher air pressures are attainable by which suspension frequencies may be made materially lower. This is not practical in an air spring suspension because of the requirement of a large compressor to maintain a high air spring pressure.

The system further lends itself to adaptation for the provision of anti-dive, anti-squat, and anti-roll effects through the leveling system. This is possible with non-compressible liquids as opposed to the compressible air medium.

Other objects and advantages of this invention will be made more apparent as this description proceeds particularly when considered in connection with the accompanying drawings, wherein:

FIGURE 1 is a schematic of a leveling system employing the applicant's invention; and,
FIGURE 2 is a cross section of one of the combined liquid and air springs.

Referring now to the drawings and in particular FIGURE 1, a liquid pump 10 is provided which supplies the liquid 42 through conduit 11 to a pressure reducer valve 12 which supplies inlet feed lines 13 connected to the front leveling valve 14 and rear leveling valves 16. An accumulator 15 is tapped into the conduit 11 to provide a continuous source of pressurized liquid to the pressure reducer valve 12.

From the front leveling valve 14, pressurized liquid moves through conduits 17 to the front liquid leveled air springs indicated generally at 18. Conduits 17 are used for both the intake and exhaust of liquid from the respective liquid leveled air springs 18. Conduits 19 connect the rear oil leveled air springs 21 with the leveling valves 16 for the intake and exhaust of pressurized liquid to and from the rear oil leveled air springs. The leveling valves 14 and 16 are actuated by linkage members 22 and 23 which are connected to appropriate and known chassis members to actuate the front and rear leveling valves in accordance with vehicle height requirements.

Pressurized liquid from the front and rear leveling valves are returned by return conduits 24 to a reservoir 26 which is connected to the pump 10.

Referring now to FIGURE 2, the liquid leveled air spring 18 comprises a pedestal 27 having a convex formed bottom 28 to which the ball joint suspension member 29 is slidably engaged. Member 29 is part of the unsprung structure of the chassis. The pedestal 27 is cylindrical in shape and is tapered at its top portion to form a neck 30 to which the lower end beaded portion 31 of a flexible container fits in a seal tight manner. Cap 23 is pressed into the neck portion 30 and effectively anchors the end portion 31 of the container about the neck portion. Connected to the lower end portion 31 is a double ply flexible but non-stretching lower body section 32 which terminates in a radially anchored rib section 34. The bead portion 35 secures the rib section 34 against radial outward movement and holds it in a sealed manner within the anular flange 41 and crimped inward section 38 of a steel dome shell 37. The securement of rib section 34 between annular flange 41 and crimped inward section 38 is completed by securing the end flange 40 of annular support 39 within the confines of the flange 41. Extending upwardly and from the rib section 34 is the upper body section 36 which is made from a flexible resilient elastomer which may stretch or contract in direct relationship to the amount of liquid contained therein. Unlike the body section 32 which is flexible but not resilient, the section 36 is easily and quickly changed in shape by the addition or removal of liquid.

The liquid leveled air spring unit may be secured to the sprung part of the frame portion of the vehicle (not shown) through support 39 in a known and conventional manner. Captive air 44 is maintained in the upper chamber of the shell 37, which is precharged to the desired air pressure through a conventional air valve 43, and occupies the area between the dome and the body section 36.

As can be seen from FIGURE 2, the air is separated from atmosphere by the dome 37 which is non-permeable and the elastomeric upper body section 36 which has some permeability. The fluid 42, however, is enclosed within the confines of the container and is positioned between the captive air and atmosphere and thus creates an effective seal against the loss of the captive air.

It will be understood that the invention is not to be limited to the exact construction shown and described, but that various changes and modifications may be made

What is claimed is:

1. An improved liquid leveled air spring unit for a motor vehicle having sprung and unsprung members, a source of pressurized liquid, and leveling means responsive to motor vehicle height requirements communicating with the source of pressurized liquid and the liquid leveled air spring, said unit comprising in combination a first element adapted to be connected to one of said members, a second element telescopically related to said first element and adapted to be connected to the other of said members, and a separate flexible liquid container adapted to be open to the leveling means and filled with pressurized liquid, said flexible container having spaced portions connected to said first and second elements respectively and leaving an air space between one element and the flexible container, said air space containing a predetermined volume of pressurized air.

2. A liquid leveled air spring unit for a motor vehicle having sprung and unsprung chassis members, a source of pressurized liquid and means responsive to vehicle height requirements for varying the amount of pressurized fluid in said unit, comprising in combination a shell member adapted to be secured to the sprung chassis member of the vehicle, a piston adapted to be connected to the unsprung chassis member of the vehicle, said piston being movable axially inwardly and outwardly of said shell in jounce and rebound movements of the unsprung chassis member, a flexible liquid container adapted to be open to the source of pressurized liquid interposed between the piston member and having an end portion secured to the piston member and an axially spaced apart rib portion secured to the shell, a flexible non-elastic lower body section connecting the rib portion to the end portion in a liquid-tight manner and closing off the area between the piston and the shell, an upper body section having elastomeric properties sealing the container at the rib portion and providing an air space between the upper body section and the inside of the shell, valve means in said shell communicating with said air space, a predetermined volume of pressurized air introduced through said valve into said air space, and pressurized liquid from said source of pressurized liquid in said flexible container.

3. The structure defined by claim 2 which is further characterized in that said shell comprises an inverted cuplike member having an annular inward flange at the open end of the shell, and said flexible container annular rib being contained in said flange and prevented from moving axially or radially of said inward flange.

4. An independent suspension for a motor vehicle having sprung and unsprung structures, comprising a pedestal adapted to be mounted upon said unsprung structure, an inverted cuplike shell axially aligned with said pedestal and adapted to be mounted upon said sprung structure, a separate flexible liquid container having spaced portions connected to said shell and said pedestal respectively, a pressurized air chamber between the closed end of the shell and said flexible liquid container, and a source of pressurized liquid connected to said liquid flexible container.

5. An improved liquid leveled air spring unit for a motor vehicle having sprung and unsprung members, a source of pressurized liquid, and leveling means responsive to motor vehicle height requirements communicating with the source of pressurized liquid and the liquid leveled air spring, said unit comprising in combination an upper element adapted to be connected to one of said members, a lower element telescopically related to said upper element and adapted to be connected to the other of said members, a flexible liquid container adapted to be open to the leveling means and filled with pressurized liquid interposed between said elements, said flexible container having an end portion secured to the lower element and a rib section connected to the peripheral edge of the upper element, a flexible nonelastic lower body section connecting the rib portion and the end portion, a flexible and elastic upper body section joined to said rib portion and leaving an air space between said flexible and elastic upper body section and said upper element, and a predetermined volume of pressurized air in said air space.

6. An independent suspension for a motor vehicle having sprung and unsprung portions comprising a first member adapted to be connected to the sprung portion, a second member adapted to be connected to the unsprung portion, said first and second members being substantially axially aligned with respect to each other, flexible means connecting said first and second members to each other, resilient means disposed between said flexible means and said first member defining a fluid chamber between the resilient means and the first member and a second fluid chamber between said flexible means and said resilient means, one of said chambers having a predetermined volume of pressurized compressible fluid and the other of said chambers having a varying volume of substantially incompressible fluid, and means open to the last-mentioned chamber and adapted to be connected to a source of pressurized incompressible fluid.

7. The structure defined by claim 6 which is further characterized in that said first fluid chamber defines a gas chamber and that said second fluid chamber defines a liquid chamber, said first chamber being separated from atmosphere by the first element and the liquid chamber.

8. An improved liquid leveled air spring unit for a motor vehicle having sprung and unsprung members, a source of pressurized liquid, and leveling means responsive to motor vehicle height requirements communicating with the source of pressurized liquid and the liquid leveled air spring, said unit comprising in combination a first element adapted to be connected to one of said members, a second element telescopically related to said first element and adapted to be connected to the other of said members, and a flexible liquid container adapted to be open to the leveling means and filled with pressurized liquid interposed between and connected at spaced-apart points to said first and second elements leaving an air space between one element and the flexible container, said air space containing a predetermined volume of pressurized air.

9. An improved liquid leveled air spring unit for a motor vehicle having sprung and unsprung members, a source of pressurized liquid, and leveling means responsive to motor vehicle height requirements communicating with the source of pressurized liquid and the liquid leveled air spring, said unit comprising in combination an inverted cuplike member adapted to be connected to one of said sprung and unsprung members, an element telescopically related to said inverted cuplike member and adapted to be moved telescopically inwardly and outwardly with respect to said inverted cuplike member and adapted to be connected to the other of said spring and unsprung members, a flexible liquid container adapted to be opened to the leveling means and filled with pressurized liquid interposed between said inverted cuplike member and said element, leaving air space between one of said inverted cuplike members and said element and the flexible container, means for attaching one part of the flexible container to the inverted cuplike member and additional means for attaching another part of the flexible container to said element.

10. A liquid leveled spring unit for a motor vehicle having sprung and unsprung members comprising a first element adapted to be connected to one of said members, a second element telescopically related to said first element and adapted to be connected to the other of said members, a first flexible part having spaced portions engaging said first and second elements respectively, and a second flexible part engaging one of said elements and cooperating with said first flexible part to form a liquid chamber and with said last named element to form a chamber for a compressible fluid.

11. A liquid leveled spring unit for a motor vehicle having sprung and unsprung members comprising a first element adapted to be connected to one of said members, a second element telescopically related to said first element and adapted to be connected to the other of said members, a flexible member having spaced portions contacting said first and second elements respectively and a third portion bridging one of said elements to divide the latter into two chambers, one of said chambers being formed between the third portion of said flexible member and the portion of said flexible member between the above-named spaced portions thereof and adapted to contain a volume of liquid, and the other of said chambers being formed between the third portion of said flexible member and said one element and adapted to contain a volume of compressible fluid.

References Cited in the file of this patent

UNITED STATES PATENTS

| | | |
|---|---|---|
| 850,181 | Podstata | Apr. 16, 1907 |
| 1,291,016 | Kellogg | Jan. 14, 1919 |
| 2,620,182 | Marston | Dec. 2, 1952 |
| 2,720,274 | Blomquist | Oct. 11, 1955 |
| 2,844,385 | Pribonic | July 22, 1958 |
| 2,923,557 | Schilling | Feb. 2, 1960 |

FOREIGN PATENTS

| | | |
|---|---|---|
| 1,152,495 | France | Sept. 2, 1957 |